UNITED STATES PATENT OFFICE.

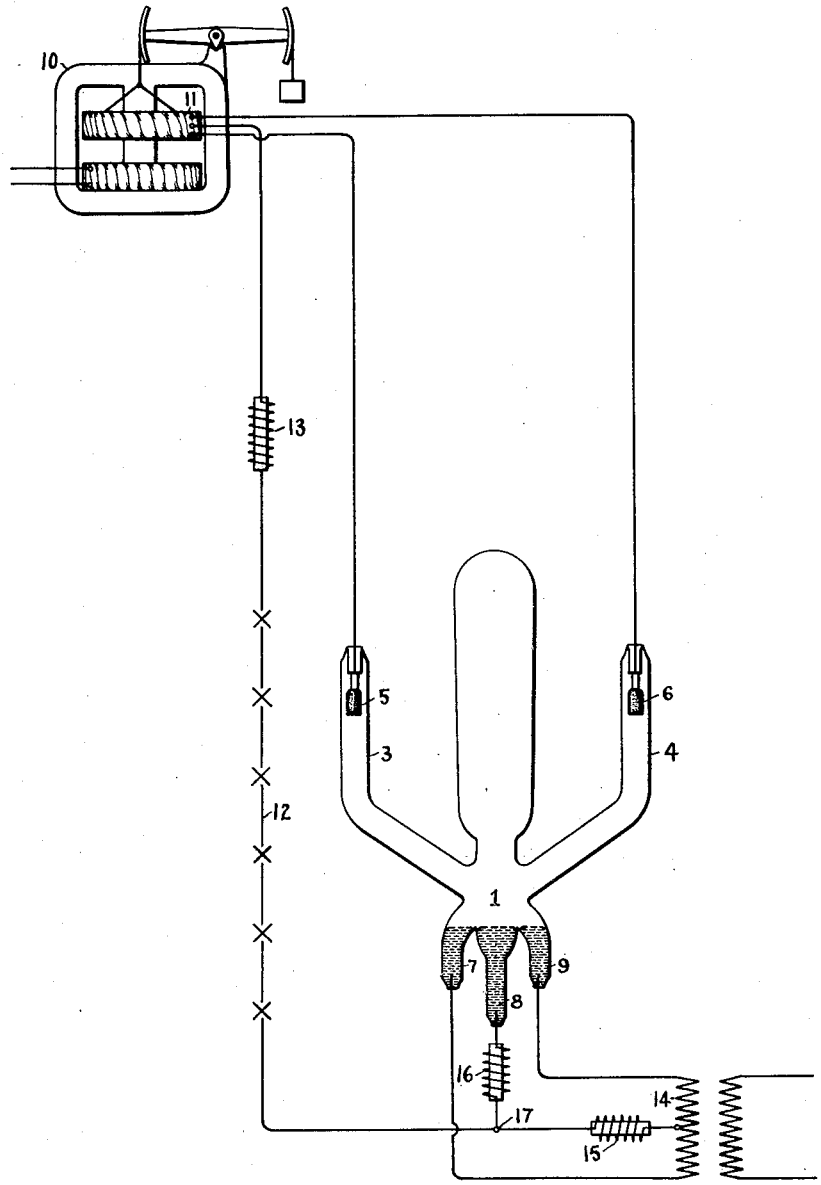

OSIAS O. KRUH, OF SCHENECTADY, NEW YORK, ASSIGNOR TO GENERAL ELECTRIC COMPANY, A CORPORATION OF NEW YORK.

RECTIFIER SYSTEM.

No. 887,659.  Specification of Letters Patent.  Patented May 12, 1908.

Application filed September 17, 1907. Serial No. 393,381.

*To all whom it may concern:*

Be it known that I, OSIAS O. KRUH, a citizen of the United States, residing at Schenectady, county of Schenectady, State of New York, have invented certain new and useful Improvements in Rectifier Systems, of which the following is a specification.

In certain forms of mercury arc rectifiers and particularly in rectifiers employed for changing high voltage alternating current into direct current, the device is started into operation by means of auxiliary electrodes fed from a separate source of current to produce an initial starting arc. The additional electrodes or anodes are usually located adjacent to the main cathode and, like the cathode, are of mercury. When such a system is in normal operation it sometimes happens that high frequency effects or high voltage oscillations occur, due to various disturbances in the system. In such cases the rectifier may sometimes go out due perhaps to a temporary reversal of current, or there may be manifestations of high differences of potential between the main cathode and one of the starting anodes. In this latter case discharges may occur which have the effect of shifting the cathode spot from the main cathode over to one of the starting anodes. I have discovered that the bad effects of these phenomena may be in a great measure prevented by interposing a suitable inductance in the cathode lead in such a way as to balance in greater or less measure the inductance in the circuits of the exciting anodes.

The features of novelty which characterize my invention are pointed out with particularity in the appended claims, while the invention itself, and particularly as embodied in practice, will be better understood by reference to the following description taken in connection with the accompanying drawings, which represent diagrammatically one embodiment of my invention.

In the drawings, the rectifier tube is indicated at 1 and may, of course, assume a variety of shapes. In the particular form shown, however, the tube has two outwardly and upwardly extending arms 3 and 4 containing the main anodes 5 and 6. At the bottom of the tube are three chambers containing bodies of mercury 7, 8 and 9, of which the body 8 constitutes the main negative electrode or cathode, while the bodies 7 and 9 constitute starting anodes.

The rectifier shown is intended for use particularly for changing high voltage alternating current into direct current, and more particularly where it is desired to supply constant direct current to a load, say of arc lamps in series. The drawing indicates such a system. The regulation is produced by securing the proper variation in the voltage of the alternating current supply and in the present instance is accomplished by the use of a well known type of constant current transformer, such as at 10, having relatively movable primary and secondary coils. The rectifier anodes 5 and 6 are connected by suitable circuits to the terminals of the secondary coil 11 of this transformer, while the consumption circuit 12, consisting of arc lamps or the like, is connected through a steadying inductance 13 to an intermediate point in the secondary 11, and preferably to the electrical center thereof. The other terminal of the load circuit 12 is connected to the cathode 8 of the rectifier.

According to the usual practice the starting or exciting anodes 7 and 9 are connected to a suitable circuit of moderate voltage, which exciting circuit may assume a variety of forms. In the present instance it is shown as consisting of a transformer having a secondary 14, the outer terminals of which are connected to the said electrodes 7 and 9. The middle or other intermediate point of the winding 14 is connected through an inductance coil 15 to a lead extending from the cathode 8.

It will now be seen that any high frequency effects or high voltage oscillations passing through the load circuit 12 will have, except for the presence of the additional inductance coil 16, an easier path through the rectifier by way of the cathode 8 than would be the case if current were to branch off and pass through the winding 14 to one or the other of the exciting anodes 7 and 9. This difference in impedance may account for the fact that high voltages or high differences of potential have been observed to exist between the cathode 8 and the starting anodes 7 and 9. I have found, however, that such high voltages, or at least any injurious effects thereof, such as jumping of the cathode spot to the anode, may be prevented by inserting the inductance 16 in the cathode lead so that the circuits branching from the junction point, such as 17, respectively to the cathode and the starting anodes, may be to some degree of approximation, of the same impedance.

While I have indicated to some extent my understanding as to the operation of the inductance coil 16, I do not wish to be confined to any particular theory of operation since the beneficial effects of my invention may be obtained regardless as to which theory be entertained.

What I claim as new and desire to secure by Letters Patent of the United States, is,—

1. The combination of an evacuated vessel provided with electrodes arranged to rectify alternating current, one of said electrodes serving as a cathode while the other electrodes serve as starting anodes, a starting circuit for supplying current to the starting anodes, and an inductance coil in circuit with the cathode and traversed both by starting current and by the main current of the device.

2. The combination of a rectifier tube having main electrodes and starting electrodes, and inductive means for opposing the development of high frequency or high voltage effects between the exciting electrodes and one of the main electrodes.

3. The combination of a mercury arc rectifier having main electrodes and starting electrodes, and inductive means for preventing the shifting of the cathode spot from one of the main electrodes to one of the starting electrodes.

In witness whereof, I have hereunto set my hand this 16th day of September 1907.

OSIAS O. KRUH.

Witnesses:
BENJAMIN B. HULL,
MARGARET E. WOOLLEY.